(12) United States Patent
Guillot et al.

(10) Patent No.: US 12,429,710 B2
(45) Date of Patent: Sep. 30, 2025

(54) CHARACTERIZING AN OPTICAL ELEMENT

(71) Applicant: Essilor International, Charenton-le-Pont (FR)

(72) Inventors: Matthieu Guillot, Charenton-le-Pont (FR); Cédric Lemaire, Charenton-le-Pont (FR); Eric Gacoin, Charenton-le-Pont (FR); Marion Cornet, Charenton-le-Pont (FR)

(73) Assignee: Essilor International, Charenton-le-Pont (FR)

( * ) Notice: Subject to any disclaimer, the term of this patent is extended or adjusted under 35 U.S.C. 154(b) by 893 days.

(21) Appl. No.: 17/252,875

(22) PCT Filed: Oct. 6, 2020

(86) PCT No.: PCT/EP2020/078003
§ 371 (c)(1),
(2) Date: Dec. 16, 2020

(87) PCT Pub. No.: WO2021/069443
PCT Pub. Date: Apr. 15, 2021

(65) Prior Publication Data
US 2022/0100000 A1    Mar. 31, 2022

(30) Foreign Application Priority Data
Oct. 7, 2019 (EP) .................... 19306294

(51) Int. Cl.
*G02C 7/02* (2006.01)
*G01M 11/02* (2006.01)
*G02B 27/00* (2006.01)

(52) U.S. Cl.
CPC ......... *G02C 7/027* (2013.01); *G01M 11/0228* (2013.01); *G02B 27/0012* (2013.01); *G02C 7/028* (2013.01); *G02C 2202/24* (2013.01)

(58) Field of Classification Search
CPC .......... G01M 11/0264; G01M 11/025; G01M 11/0235; G01M 11/0228; G01M 11/02;
(Continued)

(56) References Cited

U.S. PATENT DOCUMENTS 4,459,027 A * 7/1984 Kafri .................... G01B 11/254
250/559.22
5,825,476 A * 10/1998 Abitol ................ G01M 11/0242
356/127
(Continued)

FOREIGN PATENT DOCUMENTS

CN   104749791 A   7/2015
CN   105445959 A   3/2016
(Continued)

OTHER PUBLICATIONS

Combined Chinese Office Action and Search Report issued Aug. 15, 2022 in Chinese Patent Application No. 202080003381.2 (with English translation), 14 pages.
(Continued)

*Primary Examiner* — Travis S Fissel
(74) *Attorney, Agent, or Firm* — Oblon, McClelland, Maier &Neustadt, L.L.P.

(57) ABSTRACT

A method for characterizing optical elements of a lens element adapted for a person is presented, the lens element including: a holder including a refraction area having a refractive power based on a prescription for correcting an abnormal refraction of an eye of the person; and a plurality of optical elements configured so that at least one of slow down, retard or prevent a progress of the abnormal refraction of the eye of the person. A two-dimensional representation of the local optical power of the lens element is obtained using a fringe deflectometry method and the images used for
(Continued)

the fringe deflectometry method consist of pixels smaller than or equal to 0.05 mm×0.05 mm.

15 Claims, 4 Drawing Sheets

(58) Field of Classification Search
CPC ........... G01M 11/00; G01N 2021/8829; G01N 2021/8825; G01N 2021/8822; G01N 2021/8819; G01N 2021/8816; G01N 2021/8812; G01N 2021/8809; G01N 2021/8806; G01N 2021/458; G01N 21/456; G01N 21/455; G01N 21/453; G01N 21/45
USPC ................ 356/601–609, 450, 126, 127, 124; 351/221, 208; 359/159.74
See application file for complete search history.

(56) References Cited

U.S. PATENT DOCUMENTS

| | | | |
|---|---|---|---|
| 2008/0073525 A1* | 3/2008 | Gross ................. | G01M 11/0264 250/307 |
| 2015/0192769 A1* | 7/2015 | Dresel ................ | G01B 9/02085 356/450 |
| 2015/0249096 A1* | 9/2015 | Lupino ............. | H01L 27/11898 257/203 |
| 2016/0062144 A1 | 3/2016 | Brennan et al. | |
| 2017/0131567 A1* | 5/2017 | To ............................ | G02C 7/06 |
| 2017/0192250 A1 | 7/2017 | Rousseau et al. | |
| 2017/0208255 A1* | 7/2017 | Christen ................... | G06T 7/90 |
| 2017/0276961 A1 | 9/2017 | Wooley et al. | |
| 2017/0309223 A1* | 10/2017 | Deeman .................. | H05K 3/28 |
| 2018/0167558 A1* | 6/2018 | Hirai .................... | H04N 23/683 |
| 2019/0310481 A1* | 10/2019 | Blum ................. | G02B 27/0172 |

FOREIGN PATENT DOCUMENTS

| | | |
|---|---|---|
| CN | 106461968 A | 2/2017 |
| CN | 107219640 A | 9/2017 |
| WO | WO 97/05467 A1 | 2/1997 |
| WO | WO 2019/166657 A1 | 9/2019 |

OTHER PUBLICATIONS

International Search Report and Written Opinion issued on Dec. 18, 2020 in PCT/EP2020/078003 filed on Oct. 6, 2020, 13 pages.
Knauer, M.C. et al., "Measuring the refractive power with deflectometry in transmission", DGaO Proceedings 2008, 2008, XP055258550A, ISSN: 1614-8436, 2 total pages.
Jiang, L. et al., "Wavefront aberration metrology based on transmitted fringe deflectometry", Applied Optics, vol. 56, No. 26, 2017, XP055681230A, ISSN: 1559-128X, pp. 7396-7403, 8 total pages.
Knauer, M.C. et al., "Phase Measuring Deflectometry: a new approach to measure specular free-form surfaces", Proc. of SPIE, vol. 5457, 2004, XP055118189A, ISSN: 0277-786X, pp. 366-376, 11 total pages.

* cited by examiner

CHARACTERIZING AN OPTICAL ELEMENT

TECHNICAL FIELD

The invention relates to a method implemented by computer means for characterizing optical elements of a lens element adapted for a person, to a method for checking the conformity of a manufactured lens element and to a method for controlling a lens element manufacturing process for manufacturing lens elements.

BACKGROUND OF THE INVENTION

Myopia of an eye is characterized by the fact that the eye focuses distant objects in front of its retina. Myopia is usually corrected using a concave lens and hypermetropia is usually corrected using a convex lens.

It has been observed that some individuals when corrected using conventional single vision optical lenses, in particular children, focus inaccurately when they observe an object which is situated at a short distance away, that is to say, in near vision conditions. Because of this focusing defect on the part of a myopic child which is corrected for his far vision, the image of an object close by is also formed behind his retina, even in the foveal area.

Such focusing defect may have an impact on the progression of myopia of such individuals. One may observe that for most of said individual the myopia defect tends to increase over time.

Optical lenses comprising optical elements such as microlenses adapted to slow down myopia progression may be a solution to slowing down myopia.

However, characterizing such optical elements, in particular the optical elements, is complex and costly.

The measurement must be reliable and preferably carried out in a short time. The means of measurement must be sufficiently economical to be able to be duplicated as much as necessary.

Available measurement methods are time consuming and they cover reduced areas of only a few mm$^2$.

Therefore, it appears that there is a need for a method of characterizing an optical lens having a holder comprising a refraction area having a refractive power based on a prescription for correcting an abnormal refraction of an eye of a person and a plurality of optical elements placed on at least one surface of the holder so as to at least one of slow down, retard or prevent a progress of the abnormal refraction of the eye of the person. The method should not present the drawbacks of the existing methods.

SUMMARY OF THE INVENTION

To this end, the invention proposes a method, for example implemented by computer means, for characterizing optical elements of a lens element adapted for a person, the lens element comprising:
- a holder comprising a refraction area having a refractive power based on a prescription for correcting an abnormal refraction of an eye of the person; and
- a plurality of optical elements configured so that at least one of slow down, retard or prevent a progress of the abnormal refraction of the eye of the person; wherein the method comprises obtaining a two-dimension representation of the local optical power of the lens element using a fringe deflectometry method and wherein the images used for the fringe deflectometry method consist of pixels smaller than or equal to 0.05 mm×0.05 mm.

Advantageously, using a fringe deflectometry method with images used for the fringe deflectometry method consisting of pixels smaller than or equal to 0.05 mm×0.05 mm allows characterizing the lens element using existing deflectometry measuring devices. Such measurements can be carried out in a short time and provide a characterization of the whole surface of the lens element.

Alternatively, other deflectometry methods may be used, for example using light wave analyzer that projects a beam of light rays through the lens element and deduce from the measurement of the deviation of the light rays the local curvature of the lens element.

According to further embodiments which can be considered alone or in combination:
- the method further comprises characterizing at least part of the plurality of optical elements based on at least one difference of local optical powers on the two-dimension representation of the local optical power of the lens element; and/or
- the two-dimension representation of the local optical power is obtained by comparing the two-dimension phase shift representation obtained by the fringe deflectometry method with two-dimension reference phase shift representations obtained by said fringe deflectometry method on previously measured reference optical lenses; and/or
- characterizing at least part of the plurality of optical elements comprises at least identifying the center of at least part of the optical elements, for example using a Hough transformation algorithm; and/or
- characterizing at least part of the plurality of optical elements comprises at least determining the optical power at the center of at least part of the optical elements; and/or
- characterizing at least part of the plurality of optical elements comprises at least determining the global optical power of at least part of the optical elements; and/or
- characterizing at least part of the plurality of optical elements comprises at least determining the optical cylinder value and the optical cylinder axis of at least part of the optical elements; and/or
- characterizing at least part of the plurality of optical elements comprises at least determining the peripheral optical power of at least part of the optical elements; and/or
- characterizing at least part of the plurality of optical elements comprises at least determining the asphericity of at least part of the optical elements; and/or
- characterizing at least part of the plurality of optical elements comprises at least determining the number of optical elements; and/or
- characterizing at least part of the plurality of optical elements comprises at least determining the density of optical elements; and/or
- characterizing at least part of the plurality of optical elements comprises determining the ratio of the surface of the lens element having an optical power greater than or equal to a first threshold value and smaller than or equal to a second threshold value; and/or
- characterizing at least part of the plurality of optical elements comprises at least determining the positions of the optical elements; and/or characterizing at least part of the plurality of optical elements comprises at least determining the size of at least part of the optical elements; and/or characterizing at least part of the plurality of optical elements comprises determining the optical power of the holder around the lens element and subtracting said optical power to the two-dimension representation of the local optical power; and/or the optical elements have a contour shape being inscribable in a circle having a diameter greater than or equal to 0.1 mm and smaller than or equal to 7.0 mm, for example smaller than or equal to 3.0 mm; and/or the optical elements are positioned on a network; and/o the network is a structured network; and/or the optical elements are positioned along a plurality of concentric rings; and/or the lens element further comprises at least four optical elements organized in at least two groups of contiguous optical elements; and/or each group of contiguous optical element is organized in at least two concentric rings having the same center, the concentric ring of each group of contiguous optical element being defined by an inner diameter corresponding to the smallest circle that is tangent to at least one optical element of said group and an outer diameter corresponding to the largest circle that is tangent to at least one optical elements of said group; and/or at least part of, for example all the concentric rings of optical elements are centered on the optical center of the surface of the lens element on which said optical elements are disposed; and/or the concentric rings of optical elements have a diameter comprised between 9.0 mm and 60 mm; and/or the distance between two successive concentric rings of optical elements is greater than or equal to 0.5 mm, the distance between two successive concentric rings being defined by the difference between the inner diameter of a first concentric ring and the outer diameter of a second concentric ring, the second concentric ring being closer to the periphery of the lens element; and/or the optical element further comprises optical elements positioned radially between two concentric rings; and/or the structured network is a squared network or a hexagonal network or a triangle network or an octagonal network; and/or the network structure is a random network, for example a Voronoid network; and/or at least part, for example all, of the optical elements have a constant optical power and a discontinuous first derivative between two contiguous optical elements; and/or at least part, for example all, of the optical elements have a varying optical power and a continuous first derivative between two contiguous optical elements; and/or at least one, for example all, of the optical element has an optical function of focusing an image on a position other than the retina in standard wearing conditions; and/or at least one optical element has a non-spherical focused optical function in standard wearing conditions and for peripheral vision; and/or at least one of the optical elements has a cylindrical power is a tonic refractive micro-lens; and/or the optical elements are configured so that along at least one section of the lens the mean sphere of optical elements increases from a point of said section towards the peripheral part of said section; and/or the optical elements are configured so that along at least one section of the lens the cylinder of optical elements increases from a point of said section towards the peripheral part of said section; and/or the optical elements are configured so that along the at least one section of the lens the mean sphere and/or the cylinder of optical elements increases from the center of said section towards the peripheral part of said section; and/or the refraction area comprises an optical center and the optical elements are configured so that along any section passing through the optical center of the lens the mean sphere and/or the cylinder of the optical elements increases from the optical center towards the peripheral part of the lens; and/or the refraction area comprises a far vision reference point, a near vision reference, and a meridian joining the far and near vision reference points, the optical elements are configured so that in standard wearing conditions along any horizontal section of the lens the mean sphere and/or the cylinder of the optical elements increases from the intersection of said horizontal section with the meridian towards the peripheral part of the lens; and/or the mean sphere and/or the cylinder increase function along the sections are different depending on the position of said section along the meridian; and/or the mean sphere and/or the cylinder increase function along the sections are unsymmetrical; and/or the optical elements are configured so that in standard wearing condition the at least one section is a horizontal section; and/or the mean sphere and/or the cylinder of optical elements increases from a first point of said section towards the peripheral part of said section and decreases from a second point of said section towards the peripheral part of said section, the second point being closer to the peripheral part of said section than the first point; and/or the mean sphere and/or the cylinder increase function along the at least one section is a Gaussian function; and/or the mean sphere and/or the cylinder increase function along the at least one section is a Quadratic function; and/or the optical elements are configured so that the mean focus of the light rays passing through each optical element is at a same distance to the retina; and/or the refractive area is formed as the area other than the areas formed as the plurality of optical elements; and/or for every circular zone having a radius comprised between 2 and 4 mm comprising a geometrical center located at a distance of the framing reference that faces the pupil of the user gazing straight ahead in standard wearing conditions greater or equal to said radius+5 mm, the ratio between the sum of areas of the parts of optical elements located inside said circular zone and the area of said circular zone is comprised between 20% and 70%; and/or at least part, for example all, of the optical elements are located on the front surface of the lens element; and/or at least part, for example all, of the optical elements are located on the back surface of the lens element; and/or at least part, for example all, of the optical elements are located between the front and the back surfaces of the lens element; and/or at least one, for example all, of the optical elements is a multifocal refractive micro-lens; and/or the at least one multifocal refraction micro-lens comprises a cylindrical power; and/or the at least one, for example all, multifocal refractive micro-lens comprises an aspherical surface, with or without any rotational symmetry; and/or at least one, for example all, of the optical elements is a toric refractive micro-lens; and/or at least one multifocal refractive micro-lens comprises a tonic surface; and/or at least part, for example all, optical functions comprise high order optical aberrations.

The disclosure further relates to a method, implemented by computer means, for checking the conformity of a manufactured lens element comprising:

a holder comprising a refraction area having a refractive power based on a prescription for correcting an abnormal refraction of an eye of the person; and a plurality of optical elements placed on at least one surface of the holder so as to at least one of slow down, retard or prevent a progress of the abnormal refraction of the eye of the person wherein the method comprises:

obtaining characterizing data relating to at least one characteristic of the optical elements of the lens element to be manufactured, characterizing the optical elements of the manufactured lens element using the method of the invention, comparing the characteristics of the optical elements of the manufactured lens element with the characterizing data so as to check the conformity of the manufactured lens element.

The disclosure also relates to a method for controlling a lens element manufacturing process for manufacturing lens elements comprising:

a holder comprising a refraction area having a refractive power based on a prescription for correcting an abnormal refraction of an eye of a person; and a plurality of optical elements configured so that at least one of slow down, retard or prevent a progress of the abnormal refraction of the eye of the person wherein the method comprises the steps of:

a) manufacturing a lens element according to a manufacturing process, b) determining at least one characteristic of the manufactured lens element of step a) according to the method of the invention, c) recording the difference between the determined at least one characteristic and a reference value, d) repeating regularly step a) to c) and checking the evolution of the difference over time, wherein the evolution of at least one parameter of the manufacturing process used for manufacturing the lens element is checked over time and the evolution over time of said difference is related with the evolution over time of the at least one parameter of the manufacturing process.

The disclosure further relates to a computer program product comprising one or more stored sequences of instructions that are accessible to a processor and which, when executed by the processor, causes the processor to carry out the steps of the any method of the invention.

The disclosure further relates to a computer-readable storage medium having a program recorded thereon, wherein the program makes the computer execute a method according to the disclosure.

BRIEF DESCRIPTION OF THE DRAWINGS

Non-limiting embodiments of the invention will now be described with reference to the accompanying drawing wherein.

Elements in the figures are illustrated for simplicity and clarity and have not necessarily been drawn to scale. For example, the dimensions of some of the elements in the figure may be exaggerated relative to other elements to help to improve the understanding of the embodiments of the present disclosure.

DETAILED DESCRIPTION OF EMBODIMENTS OF THE INVENTION

The invention relates to a lens element intended to be worn in front of an eye of a wearer.

In the reminder of the description, terms like «up», «bottom», «horizontal», «vertical», «above», «below», «front», «rear» or other words indicating relative position may be used. These terms are to be understood in the wearing conditions of the lens element.

In the context of the present disclosure, the term "lens element" can refer to an uncut optical lens or a spectacle optical lens edged to fit a specific spectacle frame or an ophthalmic lens and an optical device adapted to be positioned on the ophthalmic lens. The "lens element" may also refer to a transparent lens mold used to obtain a optical lens, the transparent lens mold having optical elements.

Figure 1:
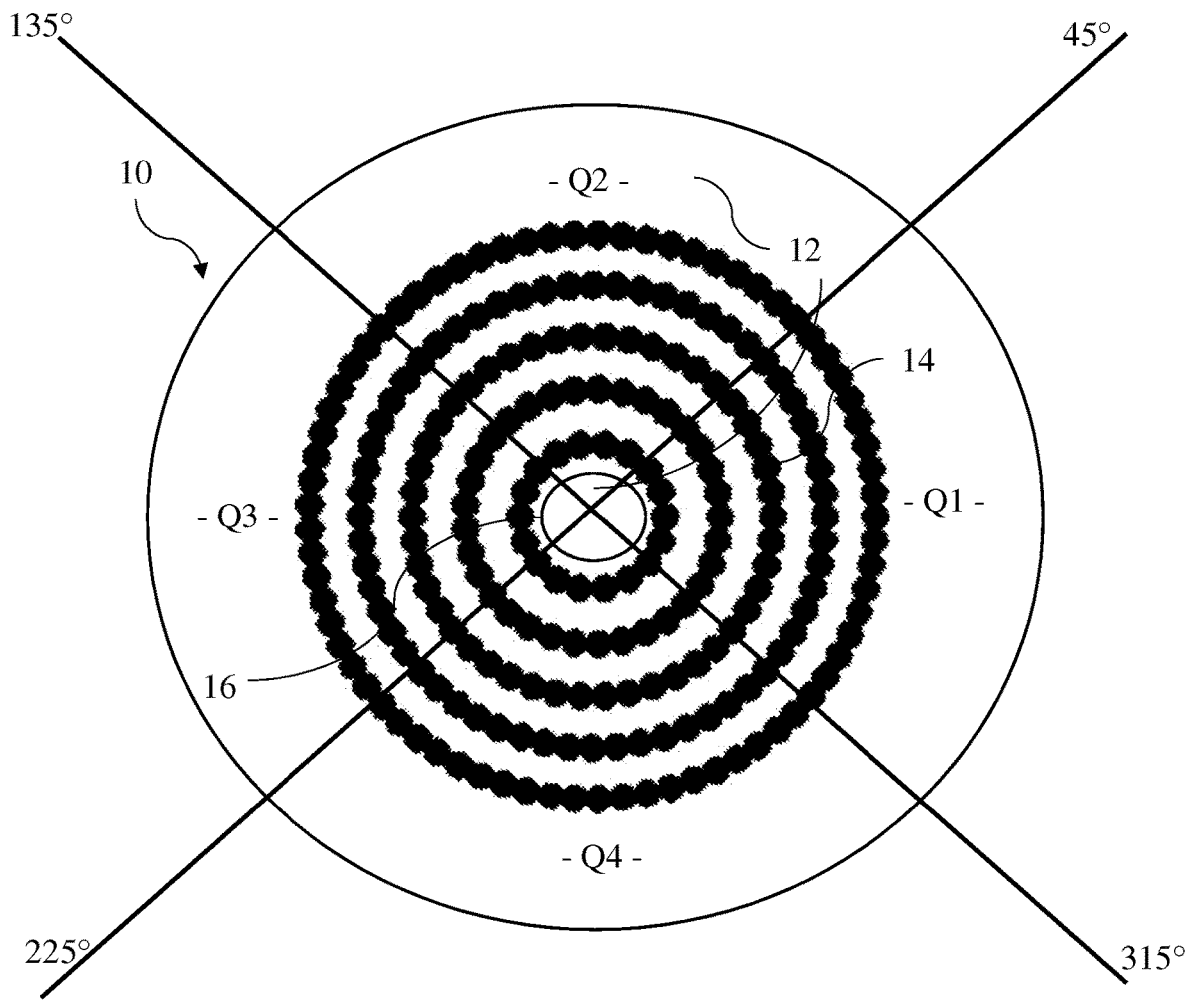
FIG. 1 is a plan view of a lens element that may be characterized by a method according to the invention.

As represented on FIG. 1, a lens element 10 according to the disclosure comprises:

a holder comprising a refraction area 12 having a refractive power based on the prescription for correcting an abnormal refraction of an eye of the person, and a plurality of optical elements 14 configured so that at least one of slow down, retard or prevent progress of the abnormal refraction of the eye of the person.

In the example represented on FIG. 1, the optical elements 14 are placed on a surface of the holder. Although the following description is detailed with that configuration, the disclosure is not limited to such configuration, in particular the optical elements may be located between the front and the back surfaces of the lens element.

The disclosure relates at least to a method, implemented by computer means for characterizing the optical elements 14 comprised on the lens element 10.

The method comprises obtaining a two-dimension representation of the local optical power of the lens element using a fringe deflectometry method.

In the present disclosure, the method of the invention is described using a transmission fringe reflectometry. However, one of ordinary skill could easily adapt the present disclosure using other deflectometry methods, such as for example, reflection deflectometry methods.

The method of the invention may further comprise at least part of the plurality of optical elements based on at least one difference of local optical powers on the two-dimension representation of the local optical power of the lens element.

Figure 3:
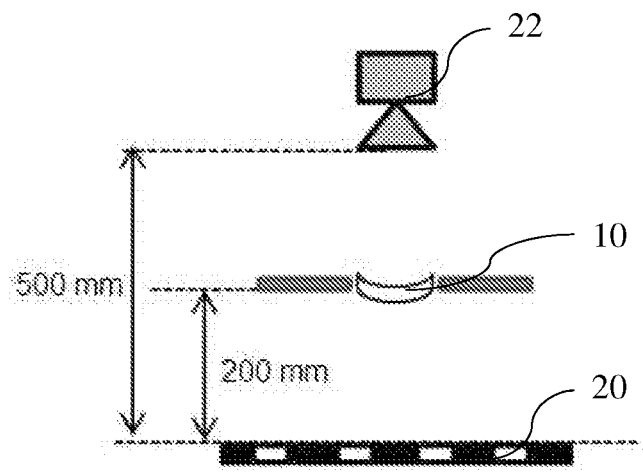
FIG. 3 is a schematic representation of a fringe deflectometry device.

As illustrated on FIG. 3, a fringe deflectometry method consists in positioning the lens element 10 to be characterized between an image display device 20 such as a screen and an image acquisition device 22 such as a camera. On the screen, black and white fringes are scrolled. Their scrolling is observed via the camera with a delay or acceleration which is related to the deviation of the light rays caused locally by the lens element 10.

The deviation of the light rays is the object of an algorithm that allows putting together a mapping of the lens element with color levels or grey levels proportional to the local optical power.

So as to characterize the optical element, the inventor had to adapt the prior art images used in traditional fringe deflectometry methods.

The inventors have determined that to accurately characterize the optical elements the image used should consist of pixels smaller than or equal to 0.05 mm×0.05 mm.

In the sense of the disclosure, the feature "image used" corresponds to the result of the transformation of the images acquired by the image acquisition device 22 by using the algorithm. In other words, the calculation is configured to generate an image calibrated to have one pixel covering 0.05×0.05 mm.

The two-dimension representation of the local optical power is obtained by comparing the two-dimension phase shift representation obtained by the fringe deflectometry method with two-dimension reference phase shift representations obtained by said fringe deflectometry method on previously measured reference optical lenses.

In other words, the two-dimension representation of the local optical power may be obtained based on a previous calibration performed with reference optical lenses measured using another device for example a lensmeter or focimeter. This calibration is preferably carried out in back vertex power, and the cylinder is not taken into account during calibration.

The inventors have manufactured optical lenses with a holder and a plurality of optical elements placed on a surface of the holder using digital surfacing manufacturing techniques.

Different optical lenses with different optical elements have been manufactured.

The optical power of the different optical elements has been characterizing first by measuring the surface of the optical lenses and using a fringe deflectometry method.

The surface measurements allow determining the best local sphere by adjustment. The optical power is approximated by the formula $P=(n-1)/R$ where P is the optical power in diopters, n the refractive index of the material, for example 1.591 for polycarbonate lens, and R the radius of the best local sphere expressed in mm.

Figure 4:
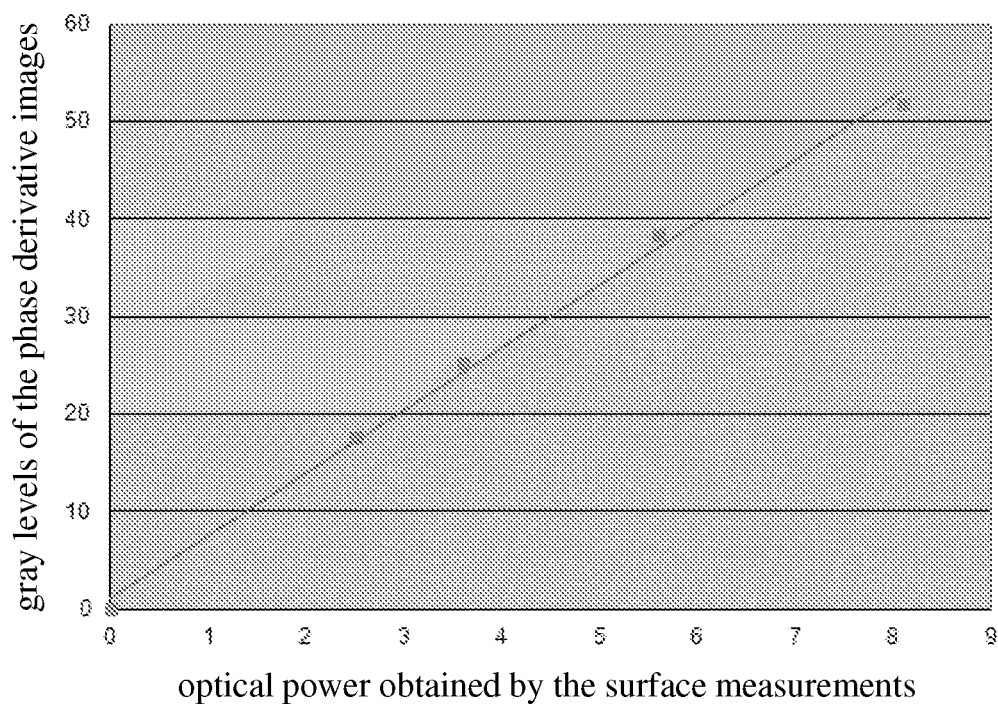
FIG. 4 illustrates the correlation between the result of the method of the invention and surface measurements.

As illustrated by FIG. 4, there is a very strong correlation between the gray levels of the phase derivative images obtained by a fringe deflectometry method of the invention and the optical power values obtained by the surface measurements.

Therefore, it is clear that the fringe deflectometry method of the invention allows characterizing the optical elements placed on the surface of the holder of a lens element.

Advantageously, the fringe deflectometry method is must easier, cheaper and shorter to implement that the surface measurement.

As illustrated on FIG. 3, the lens element 10 may be positioned on a support, with its convex face towards the screen 20. On the screen a diffuser that reduces the noise on the final result may be placed.

Images of the fringes displayed on screen as seen through the optical element 10 are recorded by the camera 22.

Figure 5:
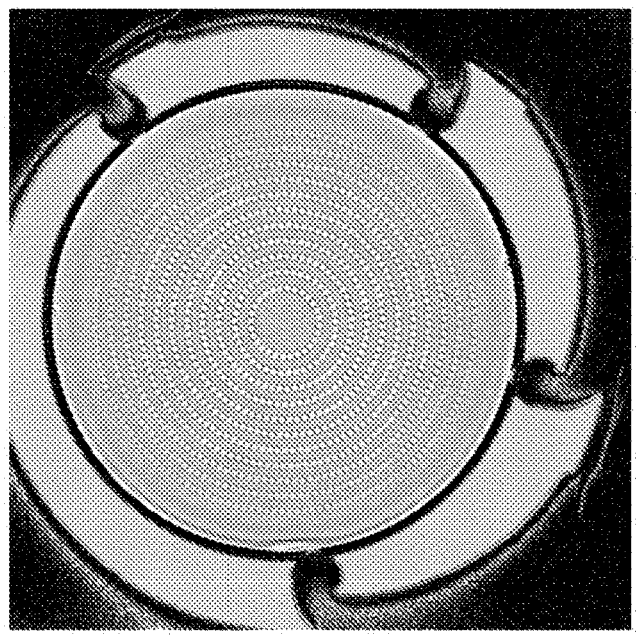
FIG. 5 is an example of an optical power map that may be obtained by the fringe deflectometry method of the invention.

FIG. 5 illustrates an example of optical power map that may be obtained by the fringe deflectometry method of the invention.

The identification of the optical elements can be made from the image representing the power levels. For example, a Hough transform is applied which allows to identify the optical element, in particular optical elements that are microlenses.

Alternatively, one may provide as follows to identify the optical elements, in particular the center of said optical elements:

one may binarize the image in order to detect the objects present in the image, any binarization method can be used, the detected objects are filtered by sizes, in particular objects that are too small and too big compared to the theoretical size of the optical elements are removed, a circular regression is applied to the remaining objects to obtain the circle describing the object, one may calculate the quadratic error between the measured object and its best circle, in order to know if the object is circular or not and to keep only the circular objects.

Remains only the objects representing the optical elements and their best circle calculated previously.

The optical elements may have a wide variety of position and optical function. Different examples of lens element with different type of optical elements are described here. The method of the invention may be used to determine different features of the optical elements depending on the configuration of the said optical elements.

For example, the method of the invention may be used to determine the optical power at the center of at least part of the optical elements. According to the present disclosure the optical power on a circle center on the center of an optical element of 0.2 mm of diameter is considered as the optical power at the center of the optical element.

The method of the invention may be used to determine for at least part of the plurality of optical elements the global optical power of at least part of the optical elements. According to the present disclosure the optical power on a circle center on the center of an optical element having a diameter of 75% of the diameter of the optical element is considered as the global optical power of the optical element.

When the optical function of the optical element comprises cylinder, the method of the invention may be used to determine the optical cylinder value and the optical cylinder axis of at least part of the optical elements.

The method of the invention may be used to determine for at least part of the plurality of optical elements the peripheral optical power.

The peripheral optical power may be defined as the optical power on a peripheral ring centered on the center of the optical element and having an inner diameter greater than 50% of the diameter of the optical element and an outer diameter smaller than or equal to the diameter of the optical element. For example, the inner diameter may be of 0.63 mm and the outer diameter may be of 0.73 mm.

The method of the invention may be used to determine for at least part of the plurality of optical elements the asphericity.

When the optical element are position according to concentric rings, as described in detail hereafter, the method of the invention may be used to determine the evolution of the optical power of the optical element according to their position on a ring or the position of the ring on the lens element.

The method of the invention may be used to determine the number of optical elements on at least part of the lens element.

The method of the invention may be used to determine the density of optical elements on at least part of the lens element.

The method of the invention may be used to determine the ratio of the surface of the lens element having an optical power greater than or equal to a first threshold value and smaller than or equal to a second threshold value.

The method of the invention may be used to determine the positions of the optical elements on the lens element.

The method of the invention may be used to determine the size of at least part of the optical elements on the lens element.

The method of the invention may be used to determine the optical power of the holder around the lens element and subtracting said optical power to the two-dimension representation of the local optical power. Advantageously, this allows obtaining an optical power for each optical element that is independent of it distance to the center of the lens element.

The method of the invention may be used to characterize lens element having different configurations. The following description illustrates the possible configuration for which the method of the invention may be particularly useful.

The refraction area 12 is configured to provide to the wearer in standard wearing conditions, in particular for foveal vision, a first optical power based on the prescription of the wearer for correcting an abnormal refraction of said eye of the wearer.

The wearing conditions are to be understood as the position of the lens element with relation to the eye of a wearer, for example defined by a pantoscopic angle, a Cornea to lens distance, a Pupil-cornea distance, a center of rotation of the eye (CRE) to pupil distance, a CRE to lens distance and a wrap angle.

The Cornea to lens distance is the distance along the visual axis of the eye in the primary position (usually taken to be the horizontal) between the cornea and the back surface of the lens; for example equal to 12 mm The Pupil-cornea distance is the distance along the visual axis of the eye between its pupil and cornea; usually equal to 2 mm.

The CRE to pupil distance is the distance along the visual axis of the eye between its center of rotation (CRE) and cornea; for example equal to 11.5 mm.

The CRE to lens distance is the distance along the visual axis of the eye in the primary position (usually taken to be the horizontal) between the CRE of the eye and the back surface of the lens, for example equal to 25.5 mm.

The pantoscopic angle is the angle in the vertical plane, at the intersection between the back surface of the lens and the visual axis of the eye in the primary position (usually taken to be the horizontal), between the normal to the back surface of the lens and the visual axis of the eye in the primary position; for example equal to 8°.

The wrap angle is the angle in the horizontal plane, at the intersection between the back surface of the lens and the visual axis of the eye in the primary position (usually taken to be the horizontal), between the normal to the back surface of the lens and the visual axis of the eye in the primary position for example equal to 0°.

An example of standard wearer condition may be defined by a pantoscopic angle of −8°, a Cornea to lens distance of 12 mm, a Pupil-cornea distance of 2 mm, a CRE to pupil distance of 11.5 mm, a CRE to lens distance of 25.5 mm and a wrap angle of 0°.

The term "prescription" is to be understood to mean a set of optical characteristics of optical power, of astigmatism, of prismatic deviation, determined by an ophthalmologist or optometrist in order to correct the vision defects of the eye, for example by means of a lens positioned in front of his eye. For example, the prescription for a myopic eye comprises the values of optical power and of astigmatism with an axis for the distance vision.

The refractive area may have a continuous variation of optical power. For example, the optical area may have a progressive addition design.

The optical design of the refraction area may comprise
a fitting cross where the optical power is negative,
a first zone extending in the temporal side of the refractive area when the lens element is being worn by a wearer. In the first zone, the optical power increases when moving towards the temporal side, and over the nasal side of the lens, the optical power of the ophthalmic lens is substantially the same as at the fitting cross.

Such optical design is disclosed in greater details in WO2016/107919.

Alternatively, the optical power in the refractive area may comprise at least one discontinuity.

As represented on FIG. 1, the lens element may be divided in five complementary zones, a central zone 16 having an optical power equal to the first refractive power and four quadrants Q1, Q2, Q3, Q4 at 45°, at least one of the quadrant having at least a point where the optical power is equal to the second optical power.

In the sense of the disclosure the "quadrants at 45°" are to be understood as equal angular quadrant of 90° oriented in the directions 45°/225° and 135°/315° according to the TABO convention as illustrated on FIG. 1.

Preferably, the central zone 16 comprises a framing reference point that faces the pupil of the wearer gazing straight ahead in standard wearing conditions and has a diameter greater than or equal to 4 mm and smaller than or equal to 22 mm.

At least the lower part quadrant Q4 may have a second optical power for central vision different from the first optical power corresponding to the prescription for correcting the abnormal refraction.

For example, the refractive area has a progressive addition dioptric function. The progressive addition dioptric function may extend between the upper part quadrant Q2 and the lower part quadrant Q4.

Advantageously, such configuration allows compensation of accommodative lag when the person looks for example at near vision distances thanks to the addition of the lens.

At least one of the temporal Q3 and nasal Q1 quadrant may have a second optical power. For example, the temporal Q3 quadrant may have a variation of power with the eccentricity of the lens.

Advantageously, such configuration increases the efficiency of the abnormal refraction control in peripheral vision with even more effect in horizontal axis.

The four quadrants Q1, Q2, Q3 and Q4 may have a concentric power progression.

As illustrated on FIG. 1, the plurality of optical elements 14 may comprise at least two optical elements that are contiguous.

In the sense of the disclosure, two optical elements located on a surface of the lens element are contiguous if there is a path supported by said surface that links the two optical elements and if along said path one does not reach the basis surface on which the optical elements are located.

When the surface on which the at least two optical elements are located is spherical, the basis surface corresponds to said spherical surface. In other words, two optical elements located on a spherical surface are contiguous if there is a path supported by said spherical surface and linking them and if along said path one may not reach the spherical surface.

When the surface on which the at least two optical elements are located is non-spherical, the basis surface corresponds to the local spherical surface that best fit said non-spherical surface. In other words, two optical elements located on a non-spherical surface are contiguous if there is a path supported by said non-spherical surface and linking them and if along said path one may not reach the spherical surface that best fit the non-spherical surface.

Advantageously, having contiguous optical elements helps improving the aesthetic of the lens element and is easier to manufacture.

At least one, preferably all of the, optical element of the plurality of optical elements 14, has an optical function of not focusing an image on the retina of the eye of the wearer, in particular for peripheral vision and preferably for central and peripheral vision.

In the sense of the disclosure "focusing" is to be understood as producing a focusing spot with a circular section that can be reduced to a point in the focal plane.

Advantageously, such optical function of the optical element reduces the deformation of the retina of the eye of the wearer in peripheral vision, allowing to slow down the progression of the abnormal refraction of the eye of the person wearing the lens element.

The at least two contiguous optical elements may be independent.

In the sense of the disclosure, two optical elements are considered as independent if producing independent images.

In particular, when illuminated by a parallel beam "in central vision", each "independent contiguous optical element" forms on a plane in the image space a spot associated with it. In other words, when one of the "optical element" is hidden, the spot disappears even if this optical element is contiguous with another optical element.

According to the disclosure, the optical elements may have specific sizes. In particular, the optical elements may have a contour shape being inscribable in a circle having a diameter greater than or equal to 0.1 mm and smaller than or equal to 7.0 mm, preferably greater than or equal to 1.0 mm and smaller than 3.0 mm, for example smaller than 2.0 mm.

The optical elements may be positioned on a network.

The network on which the optical elements are positioned may be a structured network as illustrated on FIGS. 1 and 10 to 13.

On FIGS. 1 and 10 to 12 the optical elements are positioned along a plurality of concentric rings.

The concentric rings of optical elements may be annular rings.

The lens element may further comprise at least four optical elements. The at least four optical elements are organized in at least two groups of contiguous optical elements, each group of contiguous optical element being organized in at least two concentric rings having the same center, the concentric ring of each group of contiguous optical element being defined by an inner diameter and an outer diameter.

The inner diameter of a concentric ring of each group of optical elements corresponds to the smallest circle that is tangent to at least one optical element of said group of optical elements. The outer diameter of a concentric ring of optical element corresponds to the largest circle that is tangent to at least one optical element of said group.

For example, the lens element may comprise n rings of optical elements, $f_{inner\ 1}$ referring to the inner diameter of the concentric ring which is the closest to the optical center of the lens element, $f_{outer\ 1}$ referring to the outer diameter of the concentric ring which is the closest to the optical center of the lens element, $f_{inner\ n}$ referring to the inner diameter of the ring which is the closest to the periphery of the lens element, and $f_{outer\ n}$ referring to the outer diameter of the concentric ring which is the closest to the periphery of the lens element.

The distance $D_i$ between two successive concentric rings of optical elements i and i+1 may be expressed as:

$$D_i = |f_{inner\ i+1} - f_{outer\ i}|,$$

wherein $f_{outer\ i}$ refers to the outer diameter of a first ring of optical elements i and $f_{inner\ i+1}$ refers to the inner diameter of a second ring of optical elements i+1 that is successive to the first one and closer to the periphery of the lens element.

The optical elements may be organized in concentric rings centered on the optical center of the surface of the lens element on which the optical elements are disposed and linking the geometrical center of each optical element.

For example, the lens element may comprise n rings of optical elements, $f_1$ referring to the diameter of the ring which is the closest to the optical center of the lens element and $f_n$ referring to the diameter of the ring which is the closest to the periphery of the lens element.

The distance $D_i$ between two successive concentric rings of optical elements i and i+1 may be expressed as:

$$D_i = \left| f_{i+1} - f_i - \frac{d_{i+1}}{2} - \frac{d_i}{2} \right|,$$

wherein $f_i$ refers to the diameter of a first ring of optical elements i and $f_{i+1}$ refers to the diameter of a second ring of optical elements i+1 that is successive to the first one and closer to the periphery of the lens element, and wherein $d_i$ refers to the diameter of the optical elements on the first ring of optical elements and $d_{i+1}$ refers to the diameter of the optical elements on the second ring of optical elements that is successive to the first ring and closer to the periphery of the lens element. The diameter of the optical element corresponds to the diameter of the circle in which the contour shape of the optical element is inscribed.

Advantageously, the optical center of the lens element and the center of the concentric rings of optical elements coincide. For example, the geometrical center of the lens element, the optical center of the lens element, and the center of the concentric rings of optical elements coincide.

In the sense of the disclosure, the term coincide should be understood as being really close together, for example distanced by less than 1.0 mm.

The distance $D_i$ between two successive concentric rings may vary according to i. For example, the distance $D_i$ between two successive concentric rings may vary between 2.0 mm and 5.0 mm.

The distance $D_i$ between two successive concentric rings of optical elements may be greater than 2.00 mm, preferably 2.2 mm, for example 2.5 mm, more preferably 3.0 mm.

Advantageously, having the distance $D_i$ between two successive concentric rings of optical elements greater than 2.00 mm allows managing a larger refraction area between these rings of optical elements and thus provides better visual acuity.

Considering an annular zone of the lens element having an inner diameter greater than 9 mm and an outer diameter smaller than 57 mm, having a geometrical center located at a distance of the optical center of the lens element smaller than 1 mm, the ratio between the sum of areas of the parts of optical elements located inside said circular zone and the area of said circular zone is comprised between 20% and 70%, preferably between 30% and 60%, and more preferably between 40% and 50%.

In other words, for a given value of the abovementioned ratio, the organization of contiguous optical elements in concentric rings, where these rings are spaced by a distance greater than 2.0 mm, allows providing annular zones of refractive area easier to manufacture than the refractive area managed when optical element are disposed in hexagonal network or randomly disposed on the surface of the lens element. Thereby provide a better correction of the abnormal refraction of the eye and thus a better visual acuity.

The diameter di of all optical elements of the lens element may be identical.

The distance $D_i$ between two successive concentric rings i and i+1 may increase when i increases towards the periphery of the lens element.

The concentric rings of optical elements may have a diameter comprised between 9 mm and 60 mm.

The lens element may comprise optical elements disposed in at least two concentric rings, preferably more than five, more preferably more than ten concentric rings. For example, the optical elements may be disposed in eleven concentric rings centered on the optical center of the lens.

On FIG. 1, the optical elements are micro-lenses positioned along a set of 5 concentric rings. The optical power and/or cylinder of the micro-lenses may be different depending on their position along the concentric rings.

Figure 6:
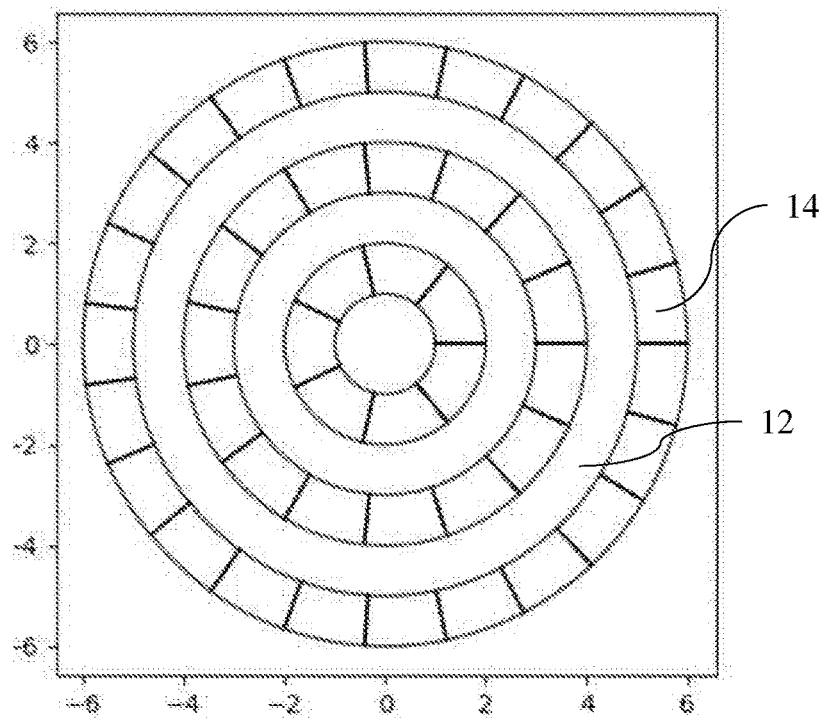
FIGS. 6 to 9 illustrate different organizations of optical elements.

On FIG. 6, the optical elements correspond to different sectors of concentric circles.

Figure 7:
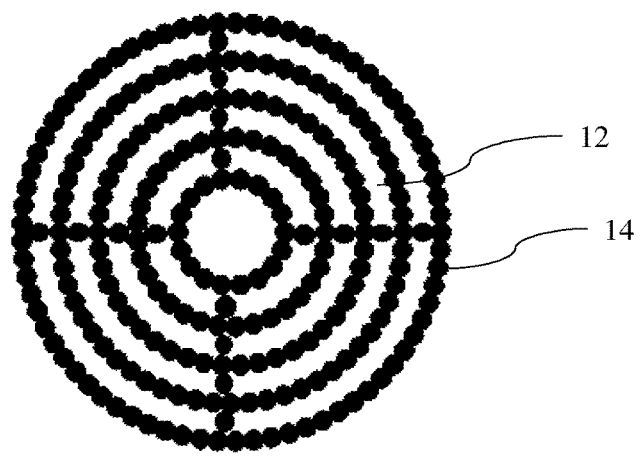

As illustrated on FIG. 7, the lens element may further comprise optical elements 14 positioned radially between two concentric rings. In the example illustrated on FIG. 7, only four optical elements are placed between two concentric rings, however, more optical elements may be positioned between both rings.

The optical elements may be placed on a structured network that is a squared network or a hexagonal network or a triangle network or an octagonal network.

Figure 8:
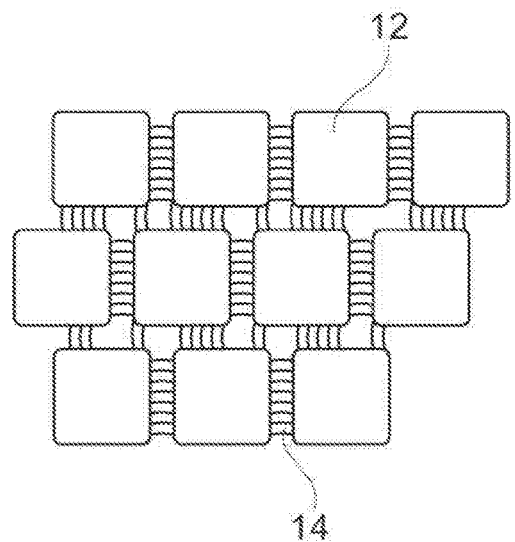

Such arrangement is illustrated on FIG. 8 where the optical elements 14 are place on a squared network.

Figure 9:
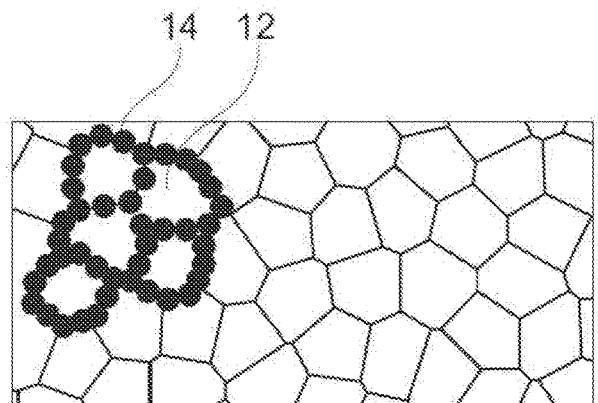

Alternatively, the optical elements may be placed on a random structure network such as a Voronoid network as illustrated on FIG. 9.

Advantageously, having the optical elements placed on a random structure limits the risk of light scattering or diffraction.

Figure 2:
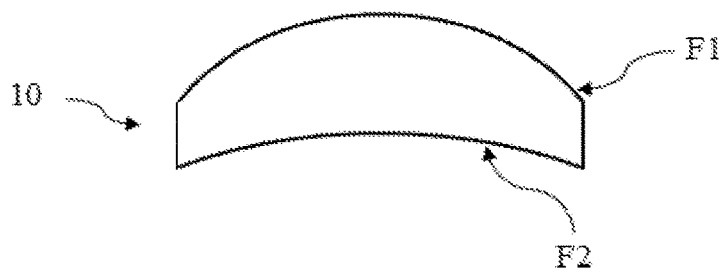
FIG. 2 is a general profile view of a lens element that may be characterized by a method according to the invention.

As illustrated on FIG. 2, a lens element 10 according to the disclosure comprises an object side surface F1 formed as a convex curved surface toward an object side, and an eye side surface F2 formed as a concave surface having a different curvature than the curvature of the object side surface F1.

At least part, for example all, of the optical elements may be located on the front surface of the lens element.

At least part, for example all, of the optical elements may be located on the back surface of the lens element.

At least part, for example all, of the optical elements may be located between the front and back surfaces of the lens element. For example, the lens element may comprise zones of different refractive index forming the optical elements.

At least one of the optical elements may have an optical function of focusing an image for peripheral vision on a position other than the retina.

Preferably, at least 50%, for example at least 80%, for example all, of the optical elements may have an optical function of focusing an image for peripheral vision on a position other than the retina.

All of the optical elements may be configured so that the mean focus of the light rays passing through each optical element is at a same distance to the retina of the wearer, at least for peripheral vision.

The optical function, in particular the dioptric function, of each optical element may be optimized so as to provide a focus image, in particular in peripheral vision, at a constant distance of the retina of the eye of the wearer. Such optimization requires adapting the dioptric function of each of the optical element depending on their position on the lens element.

The optical elements may be configured so that at least along one section of the lens the mean sphere of the optical elements increases from a point of said section towards the periphery of said section.

The mean sphere can be defined over different zone of the optical element:

For example, the mean sphere may be defined around the center of the optical element, for example over a circle of 0.2 mm of diameter.

The mean sphere may also be defined over larger diameter, for example 0.84 mm.

The mean sphere may be defined over a peripheral ring, for example having an inner diameter of 0.63 mm and an outer diameter of 0.73 mm. The optical elements may further be configured so that at least along one section of the lens, for example at least the same section as the one along which the mean sphere of the optical elements increases, the cylinder increases from a point of said section, for example the same point as for the mean sphere, towards the peripheral part of said section.

Advantageously, having optical elements configured so that along at least one section of the lens the mean sphere and/or mean cylinder of optical elements increases from a point of said section towards the peripheral part of said section allows increasing the defocus of the light rays in front the retina in case of myopia or behind the retina in case of hyperopia.

In other words, having optical elements configured so that along at least one section of the lens the mean sphere of optical elements increases from a point of said section towards the peripheral part of said section helps slow down the progression of abnormal refraction of the eye such as myopia or hyperopia.

The optical elements may be configured so that that along the at least one section of the lens the mean sphere and/or the cylinder of optical elements increases from the center of said section towards the peripheral part of said section.

The optical elements may be configured so that in standard wearing condition the at least one section is a horizontal section.

The mean sphere and/or the cylinder may increase according to an increase function along the at least one horizontal section, the increase function being a Gaussian function. The Gaussian function may be different between the nasal and temporal part of the lens so as to take into account the dissymmetry of the retina of the person.

Alternatively, the mean sphere and/or the cylinder may increase according to an increase function along the at least one horizontal section, the increase function being a Quadratic function. The Quadratic function may be different between the nasal and temporal part of the lens so as to take into account the dissymmetry of the retina of the person.

The mean sphere and/or the cylinder of optical elements may increase from a first point of said section towards the peripheral part of said section and decreases from a second point of said section towards the peripheral part of said section, the second point being closer to the peripheral part of said section than the first point.

Such configuration is illustrated in table 1 that provides the mean sphere of optical elements according to their radial distance to the optical center of the lens element.

In the example of table 1, the optical elements are micro lens placed on a spherical front surface having a curvature of 329.5 mm and the lens element is made of an optical material having a refractive index of 1.591, the prescribed optical power of the wearer is of 6 D. The optical element is to be worn in standard wearing conditions and the retina of the wearer is considered as having a defocus of 0.8 D at an angle of 30°. The optical elements are determined to have a peripheral defocus of 2D.

TABLE 1

| Distance to optical center (mm) | Mean sphere of optical element (D) |
| --- | --- |
| 0 | 1.99 |
| 5 | 2.47 |
| 7.5 | 2.81 |
| 10 | 3.02 |
| 15 | 3.00 |
| 20 | 2.49 |

As illustrated in table 1, starting close to the optical center of the lens element, the mean sphere of the optical elements increases towards the peripheral part of said section and then decreases towards the peripheral part of said section.

The mean cylinder of optical elements may increase from a first point of said section towards the peripheral part of said section and decreases from a second point of said section towards the peripheral part of said section, the second point being closer to the peripheral part of said section than the first point.

Such configuration is illustrated in tables 2 and 3 that provides the amplitude of the cylinder vector projected on a first direction Y corresponding to the local radial direction and a second direction X orthogonal to the first direction.

In the example of table 2, the optical elements are micro-lenses placed on a spherical front surface having a curvature of 167.81 mm and the lens element is made of an optical material having a refractive index of 1.591, the prescribed optical power of the wearer is of −6 D. The optical element is to be worn in standard wearing conditions and the retina of the wearer is considered as having a defocus of 0.8 D at an angle of 30°. The optical elements are determined to have a peripheral defocus of 2D.

In the example of table 3, the optical elements are micro-lenses placed on a spherical front surface having a curvature of 167.81 mm and the lens element is made of an optical material having a refractive index of 1.591, the prescribed optical power of the wearer is of −1 D. The optical element is to be worn in standard wearing conditions and the retina of the wearer is considered as having a defocus of 0.8 D at an angle of 30°. The optical elements are determined to have a peripheral defocus of 2D.

TABLE 2

| gazing direction (in degree) | Px (in Diopter) | Py (in Diopter) | Cylinder (in Diopter) |
| --- | --- | --- | --- |
| 0.00 | 1.99 | 1.99 | 1.99 |
| 18.58 | 2.32 | 2.43 | 2.37 |
| 27.00 | 2.58 | 2.73 | 2.65 |
| 34.59 | 2.77 | 2.88 | 2.83 |
| 47.25 | 2.82 | 2.66 | 2.74 |
| 57.02 | 2.45 | 1.95 | 2.20 |

TABLE 3

| gazing direction (in degree) | Px (in Diopter) | Py (in Diopter) | Cylinder (in Diopter) |
| --- | --- | --- | --- |
| 0.00 | 1.98 | 1.98 | 1.98 |
| 18.63 | 2.28 | 2.16 | 2.22 |
| 27.02 | 2.52 | 2.24 | 2.38 |
| 34.53 | 2.72 | 2.21 | 2.47 |
| 46.86 | 2.89 | 1.94 | 2.41 |
| 56.18 | 2.85 | 1.59 | 2.22 |

As illustrated in tables 2 and 3, starting close to the optical center of the lens element, the cylinder of the optical elements increases towards the peripheral part of said section and then decreases towards the peripheral part of said section.

The refraction area may comprise an optical center and optical elements are configured so that along any section passing through the optical center of the lens the mean sphere and/or the cylinder of the optical elements increases from the optical center towards the peripheral part of the lens.

For example, the optical elements may be regularly distributed along circles centered on the optical center of the refraction area.

The optical elements on the circle of diameter 10 mm and centered on the optical center of the refraction area may be micro lenses having a mean sphere of 2.75 D.

The optical elements on the circle of diameter 20 mm and centered on the optical center of the refraction area may be micro lenses having a mean sphere of 4.75 D.

The optical elements on the circle of diameter 30 mm and centered on the optical center of the refraction area may be micro lenses having a mean sphere of 5.5 D.

The optical elements on the circle of diameter 40 mm and centered on the optical center of the refraction area may be micro lenses having a mean sphere of 5.75 D.

The cylinder of the different micro lenses may be adjusted based on the shape of the retina of the person.

The refraction area may comprise a far vision reference point, a near vision reference, and a meridian joining the far and near vision reference points. For example, the refraction area may comprise a progressive additional lens design adapted to the prescription of the person or adapted to slow down the progression of the abnormal refraction of the eye of the person wearing the lens element.

Preferably, the optical elements are configured so that in standard wearing conditions along any horizontal section of the lens the mean sphere and/or the cylinder of the optical elements increases from the intersection of said horizontal section with the meridian line towards the peripheral part of the lens.

The meridian line corresponds to the locus of the intersection of the main gaze direction with the surface of the lens.

The mean sphere and/or the cylinder increase function along the sections may be different depending on the position of said section along the meridian line.

In particular, the mean sphere and/or the cylinder increase function along the sections are unsymmetrical. For example, the mean sphere and/or the cylinder increase function are unsymmetrical along vertical and/or horizontal section in standard wearing conditions.

At least one of the optical elements may have a non-focused optical function in standard wearing conditions and for peripheral vision.

Preferably at least 50%, for example at least 80%, for example all, of the optical elements 14 have a non-focused optical function in standard wearing conditions and for peripheral vision.

The at least one optical element, preferably all optical element, is/are transparent. Advantageously, the optical elements are not visible on the lens element and do not affect the aesthetics of the lens element.

The optical element may cover specific zones of the lens element, like at the center or any other area.

The central zone of the lens corresponding to a zone centered on the optical center of the lens element may not comprise any optical element. For example, the lens element may comprise an empty zone centered on the optical center of said lens element and having a diameter equal to 9 mm which does not comprise any optical element.

The optical center of the lens element may correspond to the fitting point of the lens.

Alternatively, the optical elements may be disposed on the entire surface of the lens element.

The optical element density or the quantity of power may be adjusted depending on zones of the lens element. Typically, the optical element may be positioned in the periphery of the lens element, in order to increase the effect of the optical element on myopia control, so as to compensate peripheral defocus due to the peripheral shape of the retina for example.

At the at least one, for example all, of the optical element may have a non-spherical optical function for example that are multifocal refractive microlens.

In the sense of the disclosure, a "multifocal refractive microlens" includes bifocals (with two focal powers), trifocals (with three focal powers), progressive addition lenses, with continuously varying focal power, for example aspherical progressive surface lenses.

At least one of the optical elements, preferably more than 50%, more preferably more than 80% of the optical elements may be aspherical microlenses. In the sense of the disclosure, aspherical microlenses have a continuous power evolution over their surface.

An aspherical microlens may have an asphericity comprised between 0.1D and 3D. The asphericity of an aspherical microlens corresponds to the ratio of optical power measured in the center of the microlens and the optical power measured in the periphery of the microlens.

The center of the microlens may be defined by a spherical area centered on the geometrical center of the microlens and having a diameter comprised between 0.1 mm and 0.5 mm, preferably equal to 0.2 mm.

The periphery of the microlens may be defined by an annular zone centered on the geometrical center of the microlens and having an inner diameter comprised between 0.5 mm and 0.7 mm and an outer diameter comprised between 0.70 mm and 0.80 mm.

The aspherical microlenses may have an optical power in their geometrical center comprised between 2.0D and 7.0D in absolute value, and an optical power in their periphery comprised between 1.5D and 6.0D in absolute value.

The asphericity of the aspherical microlenses before the coating of the surface of the lens element on which the optical elements are disposed may vary according to the radial distance from the optical center of said lens element. Additionally, the asphericity of the aspherical microlenses after the coating of the surface of the lens element on which the optical elements are disposed may further vary according to the radial distance from the optical center of said lens element.

At least one multifocal refractive micro-lens may have a toric surface. A toric surface is a surface of revolution that can be created by rotating a circle or arc about an axis of revolution (eventually positioned at infinity) that does not pass through its center of curvature.

Toric surface lenses have two different radial profiles at right angles to each other, therefore producing two different focal powers. Toric and spheric surface components of toric lenses produce an astigmatic light beam, as opposed to a single point focus.

The at least one of the optical elements may have a non-spherical optical function, for example all, of the optical elements is a toric refractive micro-lens. For example, a toric refractive micro-lens with a sphere power value greater than or equal to 0 diopter (δ) and smaller than or equal to +5 diopters (δ), and cylinder power value greater than or equal to 0.25 Diopter (δ).

The toric refractive microlens may be a pure cylinder, meaning that minimum meridian power is zero, while maximum meridian power is strictly positive, for instance less than 5 Diopters.

The invention has been described above with the aid of embodiments without limitation of the general inventive concept. Many further modifications and variations will be apparent to those skilled in the art upon making reference to the foregoing illustrative embodiments, which are given by way of example only and which are not intended to limit the scope of the invention, that being determined solely by the appended claims.

In the claims, the word "comprising" does not exclude other elements or steps, and the indefinite article "a" or "an" does not exclude a plurality. The mere fact that different features are recited in mutually different dependent claims does not indicate that a combination of these features cannot be advantageously used. Any reference signs in the claims should not be construed as limiting the scope of the invention.

The invention claimed is:

1. A method implemented by computer means for characterizing optical elements of a lens element adapted for a person, the lens element comprising:
   a lens substrate comprising a refraction area having a refractive power based on a prescription for correcting an abnormal refraction of an eye of the person; and
   a plurality of optical elements having a contour shape inscribable in a circle, the plurality of optical elements each having a diameter greater than or equal to 0.1 mm and smaller than or equal to 7.0 mm and being configured so that at least one of slow down, retard or prevent a progress of the abnormal refraction of the eye of the person,
   wherein the method comprises obtaining a two-dimension representation of the local optical power of the lens element using a fringe deflectometry method, and
   wherein the images used for the fringe deflectometry method are acquired by an image acquisition module and transformed to have pixels smaller than or equal to 0.05 mm×0.05 mm.

2. The method according to claim 1, wherein the method further comprises characterizing at least part of the plurality of optical elements based on at least one difference of local optical powers on the two-dimension representation of the local optical power of the lens element.

3. The method according to claim 2, wherein characterizing at least part of the plurality of optical elements comprises at least identifying the center of the optical elements.

4. The method according to claim 2, wherein characterizing at least part of the plurality of optical elements comprises at least determining the optical power at the center of at least part of the optical elements.

5. The method according to claim 2, wherein characterizing at least part of the plurality of optical elements comprises at least determining the global optical power of at least part of the optical elements.

6. The method according to claim 2, wherein characterizing at least part of the plurality of optical elements comprises at least determining the optical cylinder value and the optical cylinder axis of at least part of the optical elements.

7. The method according to claim 2, wherein characterizing at least part of the plurality of optical elements comprises at least determining the peripheral optical power of at least part of the optical elements.

8. The method according to claim 2, wherein characterizing at least part of the plurality of optical elements comprises at least determining the asphericity of at least part of the optical elements.

9. The method according to claim 2, wherein characterizing at least part of the plurality of optical elements comprises at least determining the number of optical elements and/or the density of optical elements and/or the positions of the optical elements.

10. The method according to claim 2, wherein characterizing at least part of the plurality of optical elements comprises at least determining the size of at least part of the optical elements.

11. The method according to claim 2, wherein characterizing at least part of the plurality of optical elements comprises determining the optical power of the lens substrate around the lens element and subtracting said optical power to the two-dimension representation of the local optical power.

12. A method, implemented by computer means, for checking the conformity of a manufactured lens element having a lens substrate comprising a refraction area having a refractive power based on a prescription for correcting an abnormal refraction of an eye of the person, and a plurality of optical elements having a contour shape inscribable in a circle having a diameter greater than or equal to 0.1 mm and smaller than or equal to 7.0 mm and being configured so that at least one of slow down, retard or prevent a progress of the abnormal refraction of the eye of the person, wherein the method comprises:
   obtaining characterizing data relating to at least one characteristic of the optical elements of the lens element to be manufactured;
   characterizing the optical elements of the manufactured lens element by obtaining a two-dimension representation of the local optical power of the lens element using a fringe deflectometry method, wherein the images used for the fringe deflectometry method are acquired by an image acquisition module and transformed to have pixels smaller than or equal to 0.05 mm×0.05 mm; and
   comparing the characteristics of the optical elements of the manufactured lens element with the characterizing data to check the conformity of the manufactured lens element.

13. A method for controlling a lens element manufacturing process for manufacturing lens elements having a lens substrate comprising a refraction area having a refractive power based on a prescription for correcting an abnormal refraction of an eye of a person and a plurality of optical elements having a contour shape inscribable in a circle, the plurality of optical elements each having a diameter greater than or equal to 0.1 mm and smaller than or equal to 7.0 mm and being configured so that at least one of slow down, retard or prevent a progress of the abnormal refraction of the eye of the person, wherein the method comprises:
   a) manufacturing a lens element according to a manufacturing process;
   b) determining at least one characteristic of the manufactured lens element of step a) by obtaining a two-dimension representation of the local optical power of the lens element using a fringe deflectometry method, wherein the images used for the fringe deflectometry method are acquired by an image acquisition module and transformed to have pixels smaller than or equal to 0.05 mm×0.05 mm;
   c) recording the difference between the determined at least one characteristic and a reference value; and
   d) repeating regularly step a) to c) for a plurality of lens elements and checking the evolution of the difference over time, wherein
   the evolution of at least one parameter of the manufacturing process used for manufacturing the lens element is checked over time and the evolution over time of said difference is related with the evolution over time of the at least one parameter of the manufacturing process.

14. A non-transitory computer readable medium carrying one or more sequences of instructions that when executed by a computer causes the computer to implement the method according to claim 1.

15. The method according to claim 3, wherein the center of the optical elements is identified using a Hough transformation algorithm.

* * * * *